Patented Dec. 12, 1933

1,939,217

UNITED STATES PATENT OFFICE

1,939,217

MIXED ESTERS OF CARBOXYLIC ACIDS

Lucas P. Kyrides, St. Louis, Mo., assignor, by mesne assignments, to Monsanto Chemical Company, a corporation of Delaware No Drawing. Application June 29, 1931
Serial No. 547,793

10 Claims. (Cl. 260—103)

This invention contemplates a novel class of chemical compositions characterized in that they are mixed alkyl phenyl esters of dicarboxylic acids having a tendency to form inner hydrides, such as phthalic, maleic, succinic, chlorphthalic acids, etc. Heretofore mixed alkyl esters of dicarboxylic acids have been described. Similarly, mixed phenyl esters of discarboxylic acids have been described. The compositions contemplated by the present invention are distinguishable from those which have been described heretofore in that they are mixed neutral esters of an aliphatic alcohol and a phenol. Examples of such compositions include ethyl-phenyl-phthalate, ethyl-cresyl-phthalate, methyl-cresyl-phthalate, ethyl-phenyl-succinate, methyl-phenyl-maleate, etc.

While any suitable method of preparing these novel compounds may be employed, the following examples serve to illustrate various methods by which one may prepare such compounds.

Example 1.—Diethyl-phthalate, diphenyl-phthalate and sodium ethylate dissolved in ethyl-alcohol in the ratio of 1.5:1.0:.1:.4, respectively, are heated for 40 hours at 130°. The resulting reaction mixture is cooled and diluted with chloroform, washed with aqueous sodium hydroxide and dried. Subsequently, the chloroform is distilled. Upon cooling, a small amount of unchanged diphenyl-phthalate separates which, if desired, is removed by filtration. Thereafter the liquid fraction is distilled under reduced pressures; the first fraction amounting to approximately 30% of the total consists largely of diethyl-phthalate; the second fraction, amounting to approximately 30%, boiling at 195° C. (corrected) at 4 millimeters pressure, consisting of ethyl-phenyl-phthalate is then recovered. The material is a neutral colorless liquid having a refractive index of 1.5490 at 25° C. The residue from this distillation consists largely of unreacted diphenyl-phthalate.

Example 2.—Methyl-phenyl-phthalate may be prepared conveniently by adding a mol. of phthalyl chloride to a benzene solution of phenol and methyl alcohol in approximately equal molar proportions. A violent evolution of HCl ensues. After refluxing the mixture for approximately three hours, it is treated with a solution of sodium hydroxide and thereafter washed with water and heated in vacuo to remove the solvent and water. Upon cooling, a crystalline product consisting of diphenyl-phthalate, amounting to approximately 17% of the total, separates. The liquid is distilled. The first fraction amounting to approximately 15% of the liquid will be found to consist largely of dimethyl-phthalate; the second fraction amounting to approximately 30% consists of methyl-phenyl phthalate and boils at 191° C. at 5 millimeters pressure. This product is a colorless liquid, having a refractive index at 26° of 1.5630.

Example 3.—The mono methyl ester of phthalic acid which may be made conveniently by reacting phthalic anhydride with an excess of methyl alcohol is dissolved in benzene and treated with phosphorus trichloride in an amount required to form the corresponding acid chloride. The resulting benzene solution is decanted to separate the phosphoric acid, filtered and subsequently treated with a mol equivalent of phenol. After refluxing the mixture to complete the reaction of the phenol with the acid chloride of mono-methyl-phthalate, the product is washed first with an aqueous solution of sodium hydroxide and subsequently with water. The benzene is distilled whereby practically pure methyl-phenyl-phthalate is obtained.

Example 4.—Succinic or chlor-phthalic acid esters are produced by proceeding in a manner similar to that set forth hereinabove for the preparation of mixed phthalic acid esters.

In lieu of methyl or ethyl alcohols one may employ other alcohols, including butyl, benzyl, etc. Similarly, one may substitute for phenol various cresols or mixtures thereof, naphthol, as well as substituted phenols, notably, chlorphenols, chlor-naphthol, etc.

The products hereinabove described are colorless liquids or low melting solids, having high boiling points, and have been found well suited as high boiling solvents or plasticizers in the manufacture of cellulose ester lacquers, films and plastics, as well as the manufacture of synthetic resins, notably those obtained by the condensation of phenol with formaldehyde and polyhydric alcohols with polybasic acids.

I further found that mixtures of a dialkyl ester, a diphenyl ester and a mixed alkyl phenyl ester, which may for example be produced in the manner described in Examples 1 and 2, or which may be formulated by mixing the three constituents, are well adapted for use as high boiling solvents or plasticizers in the cellulose ester and resin arts.

Although several methods for the manufacture of the novel compounds contemplated by the present invention have been set forth, it will be apparent that other methods may be employed without departing from the spirit of the invention. In the claims the expression "mixed alkyl aryl ester" and expressions of a similar nature are to be understood as comprehending esters of dicarboxylic acids in which one of the carboxyl groups is esterified by an alkyl alcohol and the other carboxyl group is esterified by a phenol.

What I claim is:

1. A mixed alkyl phenyl ester of a dicarboxylic acid.
2. A mixed alkyl phenyl ester or a dicarboxylic acid capable of forming an inner anhydride.
3. A mixed alkyl phenyl phthalate.
4. A mixed ethyl phenyl phthalate.
5. A mixed methyl phenyl phthalate.
6. A mixed alkyl phenyl succinate.
7. A dialkyl ester, a diaphenyl ester and a mixed alkyl phenyl ester of a dicarboxylic acid.
8. A composition of matter, a mixed alkyl aryl ester of a dicarboxylic acid which acid is capable of forming an inner anhydride.
9. A composition of matter, a mixed alkyl aryl ester of phthalic acid.
10. A neutral ester of a dicarboxylic acid capable of forming an inner anhydride, one of the carboxyl groups of which is esterified by a phenol and the other carboxyl group of which is esterified by an alcohol selected from a group consisting of methyl, ethyl, butyl, and benzyl alcohols.

LUCAS P. KYRIDES.

CERTIFICATE OF CORRECTION.

Patent No. 1,939,217.                                   December 12, 1933.

LUCAS P. KYRIDES.

It is hereby certified that error appears in the printed specification of the above numbered patent requiring correction as follows: Page 2, line 9, claim 2, for "or" read of; and line 76, claim 7, for "diaphenyl" read diphenyl; and that the said Letters Patent should be read with these corrections therein that the same may conform to the record of the case in the Patent Office.

Signed and sealed this 23rd day of January, A. D. 1934.

F. M. Hopkins (Seal)                                        Acting Commissioner of Patents.